United States Patent [19]

Bolk et al.

[11] Patent Number: 4,922,442

[45] Date of Patent: May 1, 1990

[54] ARRANGEMENT FOR MEASURING RADIATION QUANTA, PULSE DISCRIMINATION DEVICE SUITABLE FOR USE IN SUCH AN ARRANGEMENT AND SPECTROMETER PROVIDED WITH SUCH AN ARRANGEMENT

[75] Inventors: Hendrik J. J. Bolk; Georges C. P. Zieltjens, both of Almelo, Netherlands

[73] Assignee: U.S. Philips Corporation, New York, N.Y.

[21] Appl. No.: 183,573

[22] Filed: Apr. 19, 1988

[30] Foreign Application Priority Data

Apr. 22, 1987 [NL] Netherlands .......................... 8700949

[51] Int. Cl.⁵ ....................... G06F 15/52; G06F 15/20
[52] U.S. Cl. ..................................... 364/550; 364/527
[58] Field of Search ....................... 250/370.06, 370.07, 250/363.07, 363.02, 369, 366, 307, 308, 311, 269; 364/527, 486, 550; 307/234, 265; 328/109

[56] References Cited

U.S. PATENT DOCUMENTS

| Re. 30,904 | 4/1982 | Miller et al. | 250/363.02 |
|---|---|---|---|
| 3,984,689 | 10/1976 | Arseneau | 250/363.02 |
| 4,535,242 | 8/1985 | Dirkse et al. | 250/363.02 |
| 4,593,198 | 6/1986 | Pang et al. | 250/369 |
| 4,599,690 | 7/1986 | Stoub | 250/369 |
| 4,612,443 | 9/1986 | Alcidi | 250/363.07 |
| 4,629,895 | 12/1986 | Mestais et al. | 250/369 |
| 4,675,526 | 6/1987 | Rogers et al. | 250/363.02 |
| 4,677,300 | 6/1987 | Tawil et al. | 250/366 |
| 4,692,626 | 9/1987 | Westphal | 250/370.06 |

Primary Examiner—Kevin J. Teska
Attorney, Agent, or Firm—Paul R. Miller

[57] ABSTRACT

In a spectrometer (1), a preparation (4) is irradiated with X-ray radiation. X-ray quanta emitted by the preparation (4) are converted after reflection from an analysis crystal (9) by a detection device (13) into pulse signals. In a pulse discrimination device (26), the pulse signals are discriminated and are recorded as single or multiple integrated pulse signals in a signal processing device (40) as numbers of pulse signals. After termination of the measurement, the numbers of pulse signals are read out from the signal processing device (40) and an analysis on the number takes place by means of a data processing device (51). For example, the total number of detected quanta of monochromatic radiation may be determined.

13 Claims, 3 Drawing Sheets

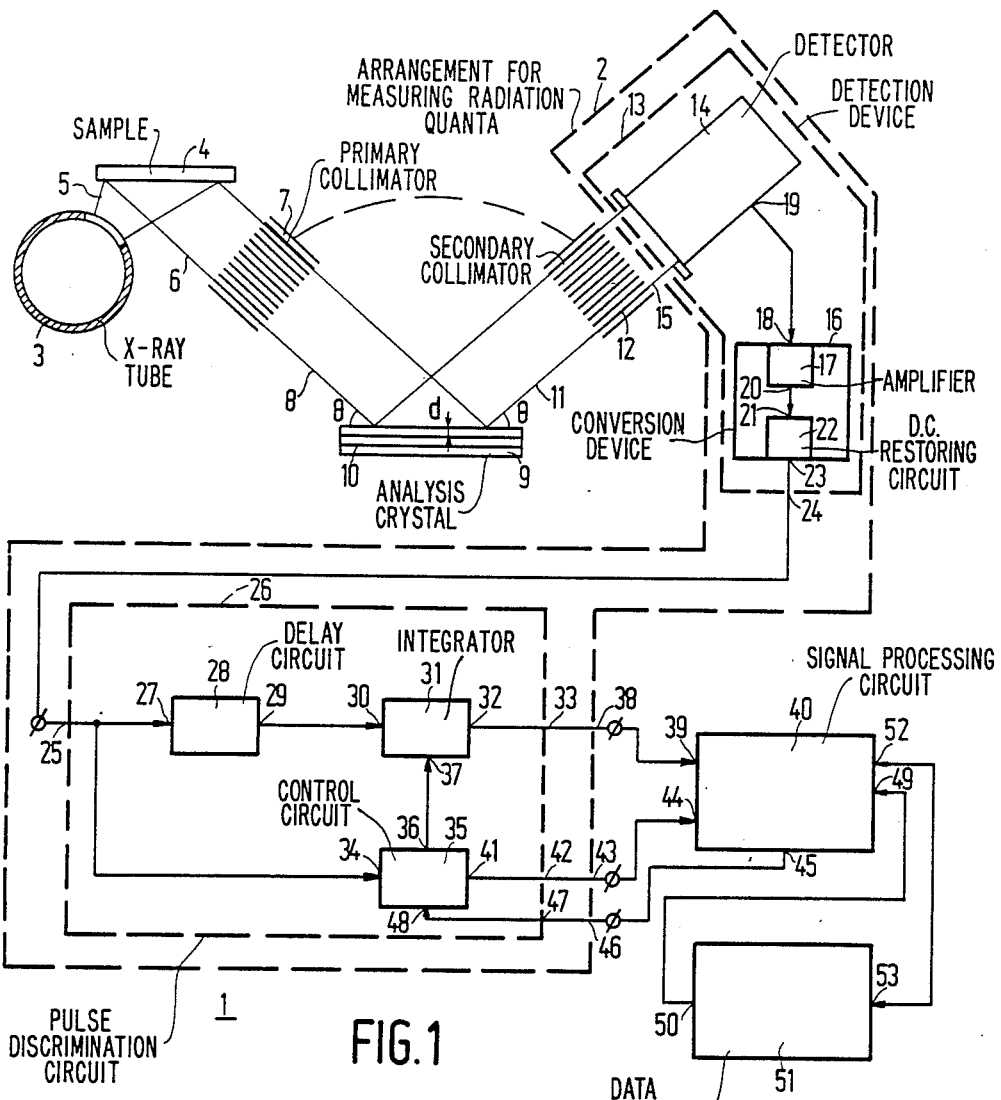
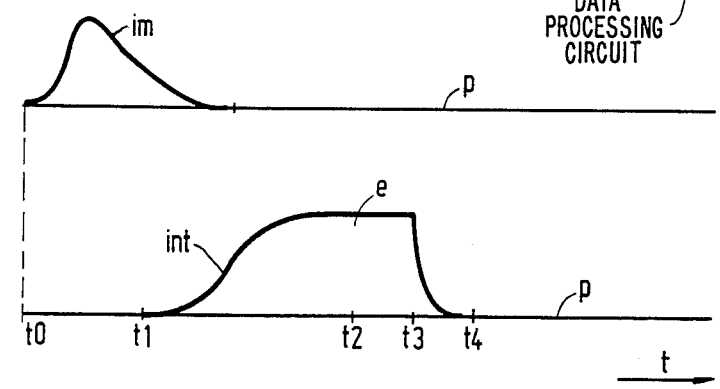

ARRANGEMENT FOR MEASURING RADIATION QUANTA, PULSE DISCRIMINATION DEVICE SUITABLE FOR USE IN SUCH AN ARRANGEMENT AND SPECTROMETER PROVIDED WITH SUCH AN ARRANGEMENT

The invention relates to an arrangement for measuring radiation quanta comprising a detection device for detecting the radiation quanta and for converting the radiation quanta into pulse signals and further comprising a pulse discrimination device for mutually discriminating the pulse signals, which is coupled by an input to an output of the detection device.

The invention also relates to a spectrometer provided with such an arrangement.

The invention further relates to a pulse discrimination device suitable for use in such an arrangement.

BACKGROUND OF THE INVENTION

Such an arrangement for measuring radiation quanta is more particularly suitable for measuring X-ray radiation, in which event for measuring the energy of quanta the quanta are converted for detection into pulse signals. The arrangement is particularly suitable for measuring monochromatic radiation.

Such an arrangement for measuring radiation quanta is known from the book "Practical X-ray Spectrometry" by R. Jenkins and J. L. de Vries, Philips Technical Library, MacMillan 1970, In chapter 3 of this book, p. 47-67, the detection of X-ray radiation is described. Several detectors are described, inter alia detectors filled with rare gas, in which X-ray quanta ionize gas atoms and electrons released thereby ionize further gas atoms. Pulse signals occur as a detector output signal. A detection device for the detection of X-ray quanta is described in FIG. 3.2 of chapter 3 on page 52 of the hook. When the detector output signal is integrated inter alia via parasitic capacitances in the detection device described, integrated pulse signals are obtained, whose pulse height is a measure of the energy of the pulse signals. After integration the output signal of the detection device decreases comparatively slowly by discharge with a comparatively large time constant. In chapter 4, p. 68.89 of the book, the processing of the integrated pulse signals after pretreatment is described. For a so-called single channel, i.e. for monochromatic radiation, with X-ray radiation fluorescence spectrometry, a pulse discrimination device is described in FIG. 4.1 on page 68 of the book. The pulse discrimination device described selects integrated pulsatory signals, the pulse height of which lies between a minimum and a maximum value adjustable in the pulse discrimination device (a so-called "window"). It is assumed that the average height is proportional to the energy of the selected pulse signals for quanta having a given wavelength. A pulse height distribution is mainly obtained by the statistical properties of the detector due to quanta of a given wavelength incident upon the detector. The maximum value and the minimum value and the difference between the maximum and minimum values are different for each wavelength. Consequently, pulse signals of different wavelengths are to be distinguished. A disadvantage of the known arrangement is that with an increase in the number of pulses per unit time - an increasing number of quanta per unit time -, an increasingly larger number of pulse signals are lost. A dead time present in the arrangement for detecting and processing the quanta will play an increasingly larger part with an increasing number of pulse signals. If more than one pulse signal falls within the dead time only one pulse signal is distinguished. On page 53 of the book, a formula is given to correct afterwards for dead time a measured number of pulse signals determined from a pulse height distribution:

$$R_c = R_m/(1 - R_m \Delta),$$

where $R_m$ is the measured number of pulse signals, $\Delta$ is the dead time of the arrangement and $R_c$ is the corrected number of pulse signals. It is assumed that the arrival of the pulse signals is susceptible to a statistical analysis. Further, the dead time $\Delta$ depends, for example, upon the influence of temperature on various parts of the arrangement. As a result, - with very large numbers of pulse signals per unit time -; the corrected number of pulse signals $R_c$ is only a comparatively coarse approximation of the real number of pulse signals occurring during measurement. A further problem arising with an increasing number of quanta per unit time in the known arrangement is that the integrated pulse signals can be piled up in case quanta enter the detection device substantially simultaneously. In the known arrangement, piled-up integrated pulse signals ensuing therefrom will be seen in the "window" as one signal, as two signals, or will even not be seen at all therein depending upon the adjusted minimum and maximum values. Also this phenomenon, which gives rise to a deviation between the actual and the measured numbers of pulse signals, is a disadvantage of the known arrangement.

SUMMARY OF THE INVENTION

The invention has for its object to provide an arrangement for measuring radiation quanta, in which the disadvantages do not occur. An arrangement for measuring radiation quanta according to the invention is for this purpose characterized in that the pulse discrimination device, whose input is coupled via a delay device to an integration input of an integrator, comprises control means for controlling the integrator, which are coupled to the input of the pulse discrimination device in order to control the integrator for integrating the pulse signals with a succession of the pulse signals within a dead time for detecting the radiation quanta and processing the pulse signals and to drive a signal processing device coupled to the integrator for processing an output signal at an output of the integrator with a succession of the pulse signals outside the dead time and to drive the integrator for resetting the output to a reference signal. Thus, it is achieved that at least substantially all the pulse signals are discriminated to very large numbers of pulse signals per unit time. The integrator serves inter alia to determine for a pulse signal the area underneath the pulse, which is a measure of the energy of the pulse signal. Integration of the pulse signals takes place in the arrangement according to the invention after the pulse signals have traversed inter alia the delay device and have not passed, as in the known arrangement, via parasitic capacitances. At the output of the integrator, integrated pulse signals are available for further processing. The control means ensure that the integrator continues to integrate when pulse signals succeed each other too rapidly to be recognized as single pulse signals. Thus, integration values can be obtained which represent a multiple energy. The control means further ensure that the integrator is reset when pulse signals are located at distances at which discrimination is possible. If a pile-up of pulse signals occurs, this also gives rise to integration values which represent a multiple energy. The integrator is read out by means of the signal processing device. The delay device is required to be sure that during the process of reading out the integrator no following pulsatory signal arrives at the integrator. The delay time of the delay device for this purpose must be longer than or equal to the sum of the times required to read out the integrator and to reset it. The total number of pulse signals can be derived from the information obtained. It should further be noted that arrangements are known per se for "pile-up" correction. For example, an arrangement is known from U.S. Pat. No. 4,629,894 for the correction of "pile-up" during the measurement of gamma radiation. Gamma quanta have a comparatively high energy with respect to X-ray quanta and further there is substantially no energy distribution of pulse signals obtained from the gamma quanta by detection. The correction described in U.S. Pat. No. 4,629,894 is implicitly based on these premises. In the case of X-ray quanta, this correction does not yield satisfactory results.

An embodiment of an arrangement for measuring radiation quanta according to the invention is characterized in that the control means comprise a device for detecting signal variations of the pulse signals, of which an input is coupled to the input of the pulse discrimination device and of which an output assumes in dependence upon the pulse signals a second state after a first state after a signal valley value and assumes the first state after the second state after a signal peak value of the pulse signals, the control means further comprising a controllable timing circuit, of which an input is coupled to the output of the device for detecting signal variations, of which an output is coupled to reset input of the integrator and to the signal processing device in order to drive the integrator for resetting and the signal processing device for processing if a time duration between the change from the second to the first state followed by the change from the first to the second state of the output of the device for detecting signal variations is longer than a predetermined time. Thus, it is achieved that partly coinciding pulse signals succeeding each other too rapidly are discriminated and can be recognized after integration as a multiple pulse signal. The device for detecting signal variations of the pulse signals is described extensively in Netherlands Patent Application No. 8,700,948, corresponding to U.S. patent application Ser. No. 07/183,203, filed April 19, 1988, filed simultaneously with the present Patent Application.

A further embodiment of an arrangement for measuring radiation quanta according to the invention is characterized in that the controllable timing circuit comprises a monostable trigger circuit, of which an input is coupled to the input of the controllable timing circuit and of which an output is coupled to the output of the controllable timing circuit, the monostable trigger circuit being provided with an adjustment input, which is coupled to adjustment means for adjusting a trigger time. In general, upon detection the pulse signal will increase more rapidly than it will decrease. The decrease of the pulse signal rather depends upon the type of detector in the detection device. When by means of the adjustment means the trigger time is tuned to the detector, the specific properties of the detector are taken into account.

A further embodiment of an arrangement for measuring radiation quanta according to the invention is characterized in that the signal processing device comprises an analogue-to-digital converter, of which an analogue input is coupled to the input of the signal processing device, and further a storage device, of which an address bus is coupled to digital outputs of the analogue-to-digital converter, as well as a control unit for controlling the storage device so as to increase a storage content by one at an address of the storage device produced by the analogue-to-digital converter at the address bus when the signal processing device is driven by the control means of the pulse discrimination device. Thus, it is achieved that with the digital output signals a storage location is addressed after the integrator has been read out. The contents of the storage location is increased by one. The storage locations in the storage device serve as counters ("event counts").

A further embodiment of an arrangement for measuring radiation quanta according to the invention, which arrangement comprises a data processing device, of which the data bus and the address bus are coupled to the data bus and the address bus, respectively, of the storage device, is characterized in that for determining a total number of measured pulses the data processing device comprises programmed calculation means for reducing pulse numbers of multiple pulses obtained by integration to pulse numbers of single pulses and to determine from pulse numbers of single and reduced single pulse numbers the total number of pulses, the pulse numbers being stored in the storage device. Thus, it is achieved that after termination of the physical measurement of the radiation quanta the data processing device reads out the storage locations ("counters") of the storage device to thus determine by reduction the total number of radiation quanta of the physical measurement. The programmed calculation means comprise multiplier means for multiplying the contents of storage locations representing a multiple energy of the pulse signals by a corresponding multiple factor and addition means for adding the multiplied contents to the contents of storage locations representing a single energy of the pulse signals so as to determine the total number of radiation quanta for a channel.

It is particularly advantageous to provide a sequential spectrometer or each channel of a simultaneous spectrometer with an arrangement for measuring radiation quanta according to the invention. By such spectrometers, higher numbers of pulsatory signals can be measured per unit time and with a greater accuracy than by known spectrometers.

BRIEF DESCRIPTION OF THE DRAWINGS

Embodiments of the invention will now be described by way of example, with reference to the accompanying drawings, in which:

FIG. 1 shows the principle circuit diagram of a spectrometer provided with an arrangement for measuring radiation quanta according to the invention.

FIG. 2 shows a pulse signal together with the variation of an integrator output signal in the pulse discrimination device in order to explain the operation of the arrangement for measuring the radiation quanta according to the invention.

DETAILED DESCRIPTION OF THE INVENTION

Figure 3:
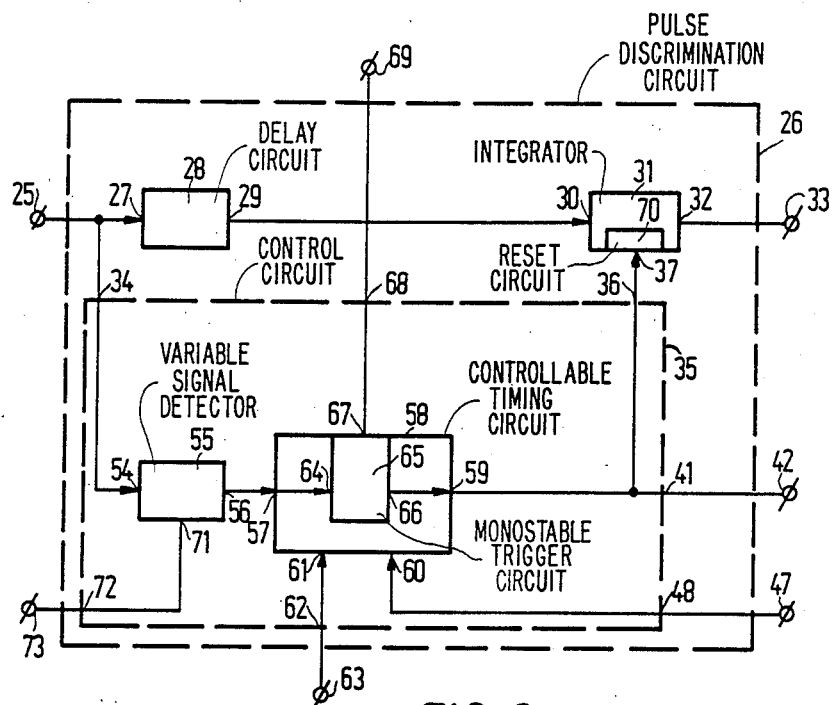
FIG. 3 shows an embodiment of a pulse discrimination device according to the invention.

In the further description it is assumed that the arrangements shown are provided with supply terminals (not shown) for connecting a supply voltage, including ground potential. For the description of the operation of the arrangements shown, it is assumed that the supply voltage is connected.

FIG. 1 shows the principle circuit diagram of a spectrometer 1, which is provided with an arrangement for measuring radiation quanta 2 according to the invention. The spectrometer 1 comprises an X-ray tube 3 for irradiating a preparation 4. Primary X-ray radiation 5 is then incident upon the preparation 4. The preparation 4 consequently emits secondary radiation 6, which is directed by a primary collimator 7. The directed radiation 8 is incident at an angle upon an analysis crystal 9, in which crystal lattice surfaces 10 are located at a relative distance d. The analysis crystal 9 reflects the directed radiation 8. The analysis crystal 9 acts as a monochromator, while for the wavelength λ of reflected radiation 11 the known Bragg relation holds:

$$n.\lambda = 2d. \sin(\theta),$$

where n is an integral number. The reflected radiation 11 is directed by a secondary collimator 12, which also encloses an angle $\theta$ with the analysis crystal 9, and is incident upon a detector 14 included in a detection device 13. The detector 14 is, for example, a detector filled with rare gas. Radiation quanta of the incident radiation 15 ionize gas atoms in such a gas-filled detector 14. By the application of a very high voltage to an anode (not shown) of the detector 14, recombination of electrons with gas atoms is at least substantially avoided. The electrons are collected at the anode. A conversion device 16 is coupled to the detector 14. The conversion device 16 comprises an amplifier 17, which is coupled by an input 18 to an output 19 of the detector 14. Furthermore, an output 20 of the amplifier 17 is coupled to an input 21 of a direct current restoring device 22 for restoring a direct current component in an output signal at the output 20 of the amplifier 17. At an output 23 of the direct current restoring device 22, pulse signals are available, whose direct current component is restored. The output 23 of the direct current restoring device 22 is coupled to an output 24 of the detection device 13. The energy content of the pulse signals is not always the same due to the fact that radiation quanta incident upon the detector 14 do not always release the same quantity of electrons. In the description it is assumed that the incident radiation 15 is monochromatic. At the output 24, pulse signals occur at arbitrary instants, the energy content of these signals satisfying a distribution function. The output 24 of the detection device 13 is coupled to a signal input 25 of a pulse discrimination device 26 for mutually discriminating the pulse signals. The signal input 25 is coupled to an input 27 of a delay device 28, which is, for example, in the form of an electronic delay line and is coupled by an output 29 to an integration input 30 of an integrator 31, of which an output 32 is coupled to a signal output 33 of the pulse discrimination device 26. The signal input 25 of the pulse discrimination device 26 is further coupled to a signal input 34 of control means 35 for controlling the integrator 31, for which purpose the control means 35 are provided with a first control output 36, which is coupled to a reset input 37 of the integrator 31. The signal output 33 of the pulse discrimination device 26 is coupled to a signal output 38 of the arrangement for measuring radiation quanta 2. The signal output 38 is coupled to a signal input 39 of a signal processing device 40. A second control output 41 of the control means 35 is coupled to a control output 42 of the pulse discrimination device 26. A control output 43 of the arrangement for measuring radiation quanta 2 is coupled to the control output 42 and further to a control input 44 of the signal processing device 40. The signal processing device 40 is provided with a report back output 45, which is coupled to a report back input 46 of the arrangement for measuring radiation quanta 2. The report back input 46 is coupled to a report back input 47 of the pulse discrimination device 26. The report back input 47 is coupled to a report back input 48 of the control means 35. An address bus 49 of the signal processing device 40 is coupled to an address bus 50 of a data processing device 51. A data bus 52 of the signal processing device 40 is coupled to a data bus 53 of the data processing device 51.

The operation of the arrangement for measuring radiation quanta and of the spectrometer 1 will be described more fully with reference to FIG. 2, in which a pulse signal im at the signal input 25 of the pulse discrimination device 26 and an output signal int at the output 32 of the integrator 31 are shown as a function of the time t for $t_0$ to $t_4$ for indicating a few instants. The symbol p denotes a reference level, in this case a zero level. It is assumed that before the illustrated pulse signal im no pulse signals had entered at the signal input 25. When at $t_0$ the pulse signal im enters at the signal input 25, the delay device 28 will pass the pulsatory signal im with a certain delay on to the integrator 31. The control means 35 causes the integrator 31 to integrate the pulsatory signal im, it being assumed that the integration starts at $t_1$. At $t_2$ a signal whose signal value e is a measure for the energy of the pulse signal im is applied to the output 32. The signal value e is held by the integrator until $t_3$. The time interval $t_3 - t_2$ is necessary for signal processing to be effected by the signal processing device 40. At the instant $t_3$, the integrator 31 is reset by the control means 35. The delay device 28 is necessary to determine by means of the pulse discrimination device 26 whether any following pulse signal has entered the integrator 31 during the signal processing period. The delay time of the delay device 28 for this purpose must be longer than the time difference $t_4 - t_2$, i.e. longer than the dead time required for the signal processing of the integrated pulsatory signal to occur and for resetting of the integrator 31. The decision to be taken by the control means 35 to drive the signal processing device 40 via the second control output 41 for processing an output signal at the output 32 of the integrator 31 also depends upon the dead time for detection. A radiation quantum entering the detector 14 will produce a pulse signal im having a given time duration, i.e. the dead time for detection. The overall dead time therefore is the sum of the dead time for detection and the dead time for processing (resetting the integrator 31). The control means 35 analyses the undelayed pulse signal and following pulse signals. If pulse signals fall with respect to each other within the dead time for detection and processing, the integrator 31 will continue to integrate. If a pulse signal last entering at the signal input 25 is located at a greater time distance from a preceding entering pulse signal, the control means 35 drives the signal processing device 40 for processing and then the integrator 31 for resetting the output 32 to a reference value p. Thus, integrator output values are provided representing the energy of single or multiple pulse signals, in which event the term "multiple pulse signals" is to be understood to means single pulse signals both separated in time and piled up. The integrator output signals are processed in the signal processing device 40.

FIG. 3 shows an embodiment of a pulse discrimination device 26 according to the invention, in which like parts, signal inputs and signal outputs are denoted by the same reference numerals as in FIG. 1. In the pulse discrimination device 26, the signal input 25 is coupled to the signal input 34 of the control means 35. The signal input 34 is coupled to a signal input 54 of a device 55 for detection of signal variation, of which a control output 56 is coupled to a first control input 57 of a controllable timing circuit 58. A control output 59 of the controllable timing circuit 58 is coupled to the first and second outputs 36 and 41 of the control means 35. The controllable timing circuit further comprises a second control input 60, which is coupled to the report back input 48, and a third control input 61, which is coupled to an input 62 of the control means 35. The input 62 is coupled to an input 63 of the pulse discrimination device 26 for supplying a release signal to the arrangement for measuring radiation quanta. The first control input 57 is coupled to an input 64 of a monostable trigger circuit 65, which is present in the controllable timing circuit 58 and which is coupled by an output 66 to the control output 59. The monostable trigger circuit 65 is provided with an adjustment input 67 for adjusting a trigger time. The adjustment input 67 is coupled to an adjustment input 68 of the control means 35. The adjustment input 68 is coupled to an adjustment input 69 of the pulse discrimination device 26. The integrator 31 is provided with reset means 70 for resetting to the reference value p. The device for detecting signal variations 55 is provided with a difference value adjustment input 71 to adjust a difference value upon detection of signal variations. The difference value determines the sensitivity to noise superimposed on the pulse signals when the device for detecting signal variations is triggered. The difference value adjustment input 71 is coupled to a difference value adjustment input 72 of the control means 35 and to a difference value adjustment input 73 of the pulse discrimination device 26. For an extensive description of the device for detecting signal variations 55 relating to the pulse signals, reference may be made again to the Netherlands Patent Application No. 8,700,948, corresponding to U.S. patent application Ser. No. 07/183,203, filed April 19, 1988 filed simultaneously with the present Patent Application. The operation of the pulse discrimination device 26 is as follows. Pulse signals entering at the signal input 54 of the device for detecting signal variations 55 are analysed. If a signal peak is followed within a predetermined time by a signal valley, the monostable trigger circuit 65 is restarted and the integrator 31 will continue to integrate. A signal valley is then found after signal increase from the signal valley. If a signal valley falls outside the predetermined time, the controllable timing circuit 58 supplies a starting signal for processing the output signal of the integrator 31 at the signal processing circuit 40. The detection of the signal peaks and valleys takes place in the device for detecting signal variations 55. The predetermined time depends upon the overall dead time.

Figure 4:
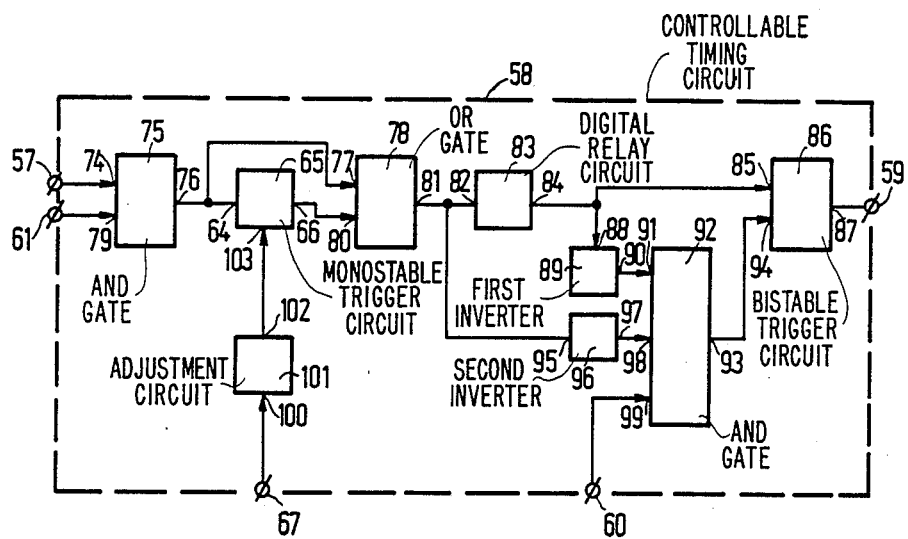
FIG. 4 shows an embodiment of a controllable timing circuit according to the invention.

FIG. 4 shows an embodiment of the controllable timing circuit 58 according to the invention, in which like parts, signal inputs and signal outputs are denoted by the same reference numerals as in FIG. 3. The first control input 57 is connected to an input 74 of a first AND gate circuit 75, of which an output 76 is connected to the input 64 of the monostable trigger circuit 65 and also to an input 77 of an OR gate circuit 78. The third control input 61 is connected to an input 79 of the AND gate circuit 75. The output 66 of the monostable trigger circuit 65 is connected to an input 80 of the OR gate circuit 78. An output 81 of the OR gate circuit 78 is connected to an input 82 of a digital delay circuit 83, of which an output 84 is connected to a set input 85 of a bistable trigger circuit 86, which is connected via an inverted output 87 to the control output 59 of the controllable timing circuit 58. The output 84 is connected to an input 88 of a first inverter 89, which is connected by an output 90 to an input 91 of a second AND gate circuit 92. An output 93 of the AND gate circuit 92 is connected to a reset input 94 of the bistable trigger circuit 86. Further, the output 81 of the OR gate circuit 78 is connected to an input 95 of a second inverter 96, which is connected by an output 97 to an input 98 of the second AND gate circuit 92. The second control input 60 is connected to an input 99 of the AND gate circuit 92. The adjustment input 67 is connected to an input 100 of adjustment means 101, which are connected by an output 102 to an adjustment input 103 of the monostable trigger circuit 65. The controllable timing circuit 58 is released if a log "1" signal is supplied at the third control input 61. The monostable trigger circuit 65 produces with the OR gate circuit 78 a pulse having a pulse duration which depends upon the trigger time of the monostable trigger circuit 65. The pulse starts when a leading edge appears at the first control input 57. A pulse signal is then found at the input 54 of the device for detecting signal variations 55. Via the adjustment input 67, the adjustment means 101 can be driven to adjust the trigger time of the monostable trigger circuit 65. The adjustment means 101 are constituted, for example, by different capacitive elements, which determine the trigger time and one of which is adjusted by the adjustment input 67. The pulse duration at the output of the OR gate circuit 78 is at least substantially equal to the pulse duration of a pulsatory signal. By means of the digital delay circuit 83 for delaying the pulse at the output of the OR gate circuit 78 by a time at least substantially equal to the delay time of the delay device 28, the first and second inverters 89 and 96, the report back of the signal processing device 40 at the second control input 60 and the second OR gate circuit, the timing of the bistable trigger circuit 86 is ensured so as to supply at the correct instant a starting signal for processing an output signal at the output 32 of the integrator 31. Processing must take place only after it has been ascertained that the pulse signals are located at a sufficiently large relative interval so that separate or piled-up pulsatory signals can be processed.

Figure 5:
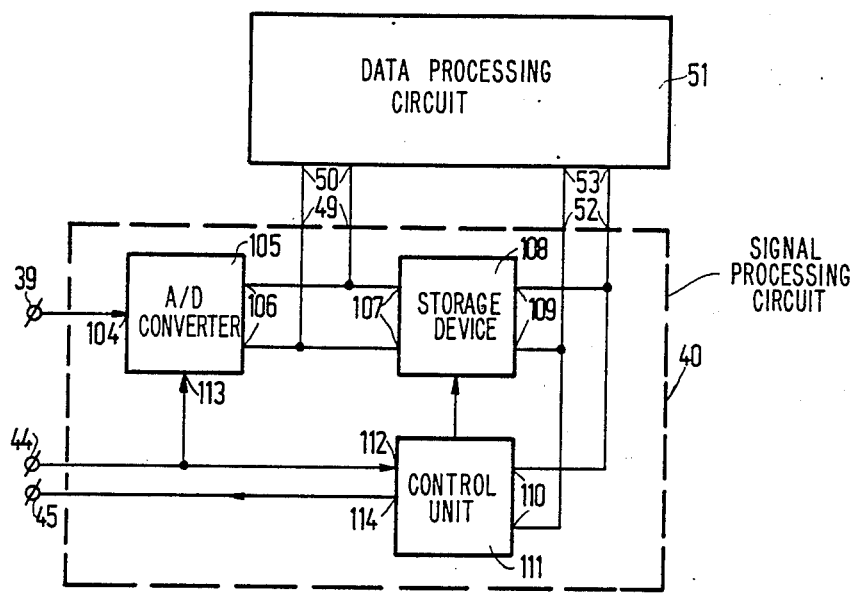
FIG. 5 shows the principle circuit diagram of a signal processing device for processing the output signal of the integrator and a data processing device coupled thereto.

FIG. 5 shows the principle circuit diagram of a signal processing device 40 for processing an output signal from the integrator 31 and a data processing device 51 coupled thereto, like parts, signal inputs and signal outputs being designated by the same reference numerals as in FIG. 1. The signal input 39 is coupled to an analogue input 104 of an analogue-to-digital converter 105. Digital outputs 106 of the analogue-to-digital converter 105 are coupled to an address bus 107 of a storage device 108, of which a data bus 109 is coupled to a data bus 110 of a control unit 111 for controlling the storage device 108. The control unit 111 is provided with a control input 112, which is coupled to a starting input 113 of the analogue-to-digital converter 105 and is further coupled to the control input 44 of the signal processing device 40. Further, the control unit 111 is provided with a control output 114, which is coupled to the report back output 45. The operation is as follows. An analogue output signal from the integrator 31 is converted by the analogue-to-digital converter 105, which generates an address for the storage device 108. A signal at the inverted output 87 of the bistable trigger circuit 86 starts the conversion at a leading edge thereof. After conversion, the control unit 111 reads the storage device 108 out at the address, increases the contents of this address by one and writes the modified contents back into the storage device 108 at the address. During reading-out and writing-back of the contents at the address in the storage device 108 under the control of the control unit 111, the control unit supplies a so-called "not-ready" signal at the control output 114, as a result of which a report back signal is supplied to the controllable timing circuit 58.

Figure 6:
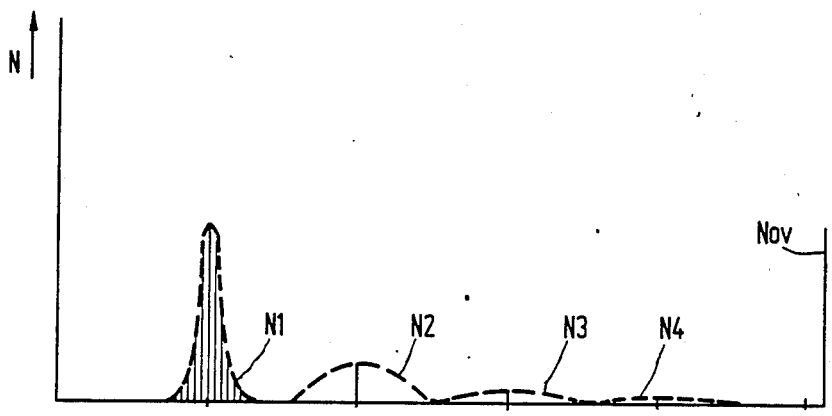
FIG. 6 shows diagrammatically storage contents of a storage device in the signal processing device after termination of a measurement by the arrangement for measuring radiation quanta according to the invention, numbers of measured pulse signals constituting the storage contents which are plotted against storage addresses.

FIG. 6 shows the stored contents in the signal processing device 40 after the termination of a measurement of radiation quanta according to the invention, numbers of measured pulse signals constituting the stored contents, which are plotted against storage addresses. By means of the data processing device 51, the stored contents of the storage device 107 are read out after the termination of a measurement. N denotes in FIG. 6 the stored contents at an address CN. The energies of the pulse signals are represented by the addresses, while the numbers of pulse signals having a given energy y are represented by the contents. N1 represents a total number of pulse signals in a distribution of energies for single pulse signals, N2 for double, N3 for triple pulse signals, and so forth. Nov denotes an overflow address; with a given adjustment of the amplification of the amplifier 17 in the detection device 13, the analogue-to-digital converter 105 generates above a given energy only a highest address for the storage device 108. The numbers N1, N2, N3 . . . are, for example with X-ray quanta, normal distributions (Gaussean distributions), of which a resolution is defined as the width of the distribution at half the height of the distribution divided by the energy at the peak of the distribution. If overlap (too poor a resolution) of the distributions of N1, N2, N3 . . . does not occur and there is no overflow in Nov, the total number of pulse signals is simply:

$$N1+2.N2+3.N3+ \ldots$$

In the case of overlap, the data processing device 51 includes known programmed means to obtain, for example, with so-called deconvolution the total number of pulse signals. If during the measurement of radiation quanta the number of quanta per second is comparatively small (<50,000 quanta per second), "pile-up" substantially will not occur. If in the case of channel filtering in the optical path of the spectrometer not only monochromatic radiation of a given energy (first order) is transmitted, but also double (second order) and higher energies occur in the detection device 13, this need not give rise to problems with the use of the arrangement according to the invention. When only the first order is processed by programmed means, a correct analysis is carried out. With very large numbers of quanta per second (>500,000 quanta per second), the number of occurring quanta of higher order should be comparatively small with respect to contributions by multiple pulse signals, while the contribution of higher order substantially does not influence the total for the first order. The correction takes place on the basis of the variation of distributions of single and multiple pulse signals.

The invention is not limited to the embodiments shown, but many variations are possible for those skilled in the art within the scope of the invention. Although it will be apparent to use according to the prior art so-called "flash" A/D converters, it may be possible for the signal processing to be carried out in a different manner when inexpensive high-speed signal processors become available. The invention is not limited either to the field of use indicated. It will be apparent that the invention can also be used for diffractometers. However, it may also be used, for example, for the measurement of gamma quanta or with electron-optical systems. The use of the pulse discrimination device 26 is conceivable in all these cases in which pulse signals enter at arbitrary instants and, for example, "pile-up" occurs.

What is claimed is:

1. An arrangement for measuring radiation quanta comprising:
   (a) detection means for detecting radiation quanta and for converting said radiation quanta into pulse signals,
   (b) pulse discrimination means for mutually discriminating said pulse signals, said pulse discrimination means having an input coupled to an output of said detection means,
   said pulse discrimination means including
       (i) delay circuit means coupled to said input for delaying said pulse signals,
       (ii) integrator means coupled to an output of said delay circuit means for integrating said pulse signals,
       (iii) control means separately coupled to said input for controlling said integrator means, said control means driving said integrator means to integrate a succession of delayed pulse signals within a dead time during detection of said radiation quanta, and
   (c) signal processing means coupled to said integrator means and being driven by said control means for processing output signals from said integrator means using a succession of pulse signals outside said dead time, said control means also driving said integrator means to reset said output signals to a reference signal.

2. An arrangement according to claim 1, wherein said control means include signal variation detection means for detecting signal variations of said pulse signals, said signal variation detection means having an input coupled to said input of said pulse discrimination means, and said signal variation detection means having an output, said output alternatively being in a first state and a second state depending on said pulse signals, said first state occurring after a signal peak value of said pulse signals, and said second state occurring after a signal valley value of said pulse signals, and wherein said control means further include a controllable timing circuit having an input coupled to said output of said signal variation detection means, said controllable timing circuit having an output coupled both to an input of said integrator means and to said signal processing means, said input of said integrator means receiving a reset input, said output of said controllable timing circuit driving said integrator means for resetting said reset input and driving said signal processing means for processing signals if a time duration between change from said second state to said first state followed by a change from said first state to said second state is longer than a predetermined time.

3. An arrangement according to claim 1, wherein said controllable timing circuit includes a monostable trigger circuit, said monostable trigger circuit having an input coupled to said input of said controllable timing circuit, said monostable trigger circuit having an output coupled to said output of said controllable timing circuit, and said monostable trigger circuit having an adjustment input coupled to adjustment means for adjusting a trigger time.

4. An arrangement according to claim 1 or claim 2 or claim 3, wherein said signal processing means include an analog-to-digital converter, said analog-to-digital converter having an analog input coupled to an input of said signal processing means, storage device means for storing said pulse signals, said storage device means having an address bus coupled to a digital output of said analog-to-digital converter, and a control unit for controlling said storage device means to increase storage content by one upon addressing said address bus by said analog-to-digital converter when said control means drives said signal processing means.

5. An arrangement according to claim 4, wherein data processing means for determining total numbers of measured pulse signals are coupled to said signal processing means, said data processing means having a data bus and an address bus coupled respectively to said signal processing means, and wherein said data processing means includes programmed calculation means for reducing numbers of pulse signals obtained by integration to numbers of single pulse signals and for determining said total numbers of measured pulse signals from said numbers of single pulse signals and reduced numbers of single pulse signals, said numbers of single pulse signals being stored in said storage device means.

6. A pulse discrimination device for use in an arrangement for measuring radiation quanta comprising:
(a) delay circuit means coupled to an input of the pulse discrimination device for delaying pulse signals input into said pulse discrimination device,
(b) integrator means coupled to an output of said delay circuit means for integrating said pulse signals, and
(c) control means also coupled to said input of said pulse discrimination device for controlling said integrator means to integrate a succession of delayed pulse signals within a dead time during detection of radiation quanta.

7. An arrangement according to claim 6, wherein said control means include signal variation detection means for detecting signal variations of said pulse signals, said signal variation detection means having an input coupled to said input of said pulse discrimination means, and said signal variation detection means having an output, said output alternatively being in a first state and a second state depending on said pulse signals, said first state occurring after a signal peak value of said pulse signals, and said second state occurring after a signal valley value of said pulse signals, and wherein said control means further include a controllable timing circuit having an input coupled to said output of said signal variation detection means, said controllable timing circuit having an output coupled both to an input of said integrator means and to said signal processing means, said input of said integrator means receiving a reset input, said output of said controllable timing circuit driving said integrator means for resetting said reset input and driving said signal processing means for processing signals if a time duration between change from said second state to said first state followed by a change from said first state to said second state is longer than a predetermined time.

8. An arrangement according to claim 7, wherein said controllable timing circuit includes a monostable trigger circuit, said monostable trigger circuit having an input coupled to said input of said controllable timing circuit, said monostable trigger circuit having an output coupled to said output of said controllable timing circuit, and said monostable trigger circuit having an adjustment input coupled to adjustment means for adjusting a trigger time.

9. A spectrometer for measuring x-radiation quanta comprising:
(a) a sample preparation,
(b) x-ray tube means for irradiating said sample preparation with x-radiation,
(c) primary collimating means for collimating radiation from said sample preparation and for directing the collimated radiation,
(d) an analysis crystal receiving said collimated radiation and providing reflected radiation,
(e) secondary collimating means for collimating and directing said reflected radiation,
(f) detection means receiving the collimated reflected radiation for detecting radiation quanta and for converting said radiation quanta into pulse signals,
(g) pulse discrimination means for mutually discriminating said pulse signals, said pulse discrimination means having an input coupled to an output of said detection means,
said pulse discrimination means including
  (i) delay circuit means coupled to said input for delaying said pulse signals,
  (ii) integrator means coupled to an output of said delay circuit means for integrating said pulse signals,
  (iii) control means separately coupled to said input for controlling said integrator means, said control means driving said integrator means to integrate a succession of delayed pulse signals within a dead time during detection of said radiation quanta, and
(h) signal processing means coupled to said integrator means and being driven by said control means for processing output signals from said integrator means using a succession of pulse signals outside said dead time, said control means also driving said integrator means to reset said output signals to a reference signal.

10. An arrangement according to claim 9, wherein said control means include signal variation detection means for detecting signal variations of said pulse signals, said signal variation detection means having an input coupled to said input of said pulse discrimination means, and said signal variation detection means having an output, said output alternatively being in a first state and a second state depending on said pulse signals, said first state occurring after a signal peak value of said pulse signals, and said second state occurring after a signal valley value of said pulse signals, and wherein said control means further include a controllable timing circuit having an input coupled to said output of said signal variation detection means, said controllable timing circuit having an output coupled both to an input of said integrator means and to said signal processing means, said input of said integrator means receiving a reset input, said output of said controllable timing circuit driving said integrator means for resetting said reset input and driving said signal processing means for processing signals if a time duration between change from said second state to said first state followed by a change from said first state to said second state is longer than a predetermined time.

11. An arrangement according to claim 10, wherein said controllable timing circuit includes a monostable trigger circuit, said monostable trigger circuit having an input coupled to said input of said controllable timing circuit, said monostable trigger circuit having an output coupled to said output of said controllable timing circuit, and said monostable trigger circuit having an adjustment input coupled to adjustment means for adjusting a trigger time.

12. An arrangement according to claim 9 or claim 10 or claim 11, wherein said signal processing means include an analog-to-digital converter, said analog-to-digital converter having an analog input coupled to an input of said signal processing means, storage device means for storing said pulse signals, said storage device means having an address bus coupled to a digital output of said analog-to-digital converter, and a control unit for controlling said storage device means to increase storage content by one upon addressing said address bus by said analog-to-digital converter when said control means drives said signal processing means.

13. An arrangement according to claim 12, wherein data processing means for determining total numbers of measured pulse signals are coupled to said signal processing means, said data processing means having a data bus and an address bus coupled respectively to said signal processing means, and wherein said data processing means includes programmed calculation means for reducing numbers of pulse signals obtained by integration to numbers of single pulse signals and for determining said total numbers of measured pulse signals from said numbers of single pulse signals and reduced numbers of single pulse signals, said numbers of single pulse signals being stored in said storage device means.

* * * * *